United States Patent Office 2,796,383
Patented June 18, 1957

2,796,383

COBALAMINE ANALOGS AND PROCESS OF PREPARING THE SAME

Franklin M. Robinson, Plainfield, N. J., assignor to Merck & Co., Inc., Rahway, N. J., a corporation of New Jersey No Drawing. Application July 8, 1955,
Serial No. 520,913

6 Claims. (Cl. 195—114)

This invention relates to the preparation of novel compounds having growth promoting activity. More particularly, it is concerned with processes of preparing compounds having vitamin $B_{12}$ activity, herein called 5(6)-hydroxybenzimidazole analogs of cobalamines.

By the term "5(6)-hydroxybenzimidazole analogs of cobalamines" is meant cobalamines in which the 5,6-dimethylbenzimidazole moiety of the cobalamines is replaced by 5-hydroxybenzimidazole. Examples of such compounds that might be mentioned are the 5(6)-hydroxybenzimidazole analog of cyano-cobalamin (the product corresponding to vitamin $B_{12}$ in which the 5,6-dimethylbenzimidazole moiety is replaced by 5(6)-hydroxybenzimidazole), 5(6)-hydroxybenzimidazole analog of hydroxo-cobalamin, 5(6)-hydroxy benzimidazole analog of chlorocobalamine, and the like.

It is an object of the present invention to provide processes for the preparation of 5(6)-hydroxybenzimidazole analogs of cobalamines. Other objects will be apparent from the detailed description of this invention hereinafter provided.

In accordance with the present invention, it is now found that Factor B, which may be obtained as described by Armitage et al. in the J. Chem. Soc., 3849 (1953) can be condensed with 5-hydroxybenzimidazole to produce the 5(6)-hydroxybenzimidazole analog of cyano-cobalamin. The synthesis of this product is achieved by growing a microorganism in a suitable nutrient medium containing Factor B and the substituted benzimidazole. It has been found that the strain of *Escherichia coli* originally isolated by Davis (Journal of Bacteriology 60, 17 (1953)) and designated by him as strain 113–3 is particularly useful in carrying out the processes of the present invention, although other microorganisms can also be used for this purpose. Strain 113–3 of *Escherichia coli* is deposited in the culture collection of the American Type Culture Collection as ATCC No. 11105.

In this biosynthesis involving 5-hydroxybenzimidazole and Factor B, the benzimidazole moiety can be substituted at either the nitrogen in position 1 or 3. Therefore, the condensation product can be considered to be either the 5-hydroxybenzimidazole analog of cobalamine or the 6-hydroxybenzimidazole analog of cobalamine. Accordingly, the product is referred to herein as the 5(6)-hydroxybenzimidazole analog of cobalamine.

Pursuant to one embodiment of the present invention, it is now found that when *E. coli* 113–3 is grown in a suitable nutrient medium in the presence of Factor B and a 5-hydroxybenzimidazole, the analog of vitamin $B_{12}$, in which 5(6)-hydroxybenzimidazole is substituted for the 5,6-dimethylbenzimidazole moiety, is produced and can be recovered from the nutrient medium.

Nutrient mediums which are suitable for growing *E. coli* under aerobic conditions are generally satisfactory for the processes of this invention. However, it is found that synthetic mediums are particularly advantageous since the analog produced can be readily recovered and isolated from such mediums. Thus, a medium containing betaine or sucrose, L-glutamic acid and minor amounts of inorganic salts required by the microorganism is particularly suitable in carrying out the processes of this invention.

In carrying out this process, the sterile nutrient medium containing the substituted benzimidazole and Factor B is inoculated with a vegetable culture of *E. coli* grown in a suitable synthetic medium containing L-glutamic acid, betaine or sucrose, minor amounts of inorganic salts required for the growth of the organism and either vitamin $B_{12}$ or methionine for a sufficient time to form a heavy inoculum. The resulting inoculated medium is then incubated at 37° C. for about 16 to 18 hours under aerobic conditions.

Alternatively, the desired analog is conveniently produced by intimately contacting Factor B and the benzimidazole moiety in a phosphate buffer with resting cells of *E. coli* 113–3. The resting cells of the microorganism are readily prepared by filtering off the cells growing in a suitable synthetic medium. They can then be suspended in a suitable aqueous phosphate buffer solution containing Factor B and the benzimidazole and intimately contacted by mixing at a temperature of about 20–37° C. for sufficient time to effect the synthesis of the unnatural analog.

The analog of vitamin $B_{12}$ is found to be contained in the cells of the microorganism and can be recovered from these cells by a number of procedures. Thus, the cells can be removed from the fermentation broth by centrifugation, suspended in a suitable amount of water, and steamed in an autoclave for 30 minutes for sufficient time to liberate the analog from the cells. Alternatively, the step of liberating the analog from the cells can be effected by treating the cells with water containing a surface active agent. This liberation of the analogs from the cells can be most conveniently effected in the presence of a small amount of an acid anion such as cyano, nitrite, and the like. The supernatant liquor containing the analog can then be separated from the cellular debris and treated further to recover the analog.

In one method of recovering the analog the solids obtained by drying the separated supernatant liquor are dissolved in a small amount of water and separated by paper chromatography using secondary butanol as the developing solvent. The developing solvent can be secondary butanol ranging in water content from substantially anhydrous to saturated. The use of a solvent prepared by mixing 100 parts of secondary butanol, 50 parts of water and 0.25 part of a 1% solution of sodium cyanide and discarding the aqueous phase is preferred for this paper chromatography. Alternatively, such a solvent containing a source of nitrite ions can also be used for this purpose. The vitamin $B_{12}$ analog can then be isolated and recovered from the paper chromatogram. In this method of isolating and recovering the analog, the position of the desired product is conveniently determined by preparing the analog from Factor B obtained by the acid hydrolysis of $Co^{60}$ vitamin $B_{12}$. The position of the unnatural analog containing the radioactive cobalt on the paper chromatogram can be readily determined by a scintillation counter. From the information thus obtained, the mobility of the analog can be determined and in subsequent preparation of this analog the position of the product on the paper chromatogram is readily ascertained.

Alternatively, the analog can be recovered from heated aqueous suspensions of the cells of a series of steps involving filtration of the cellular mixture after addition of a small amount of sodium nitrite and/or potassium cyanide and adjustment of the pH to about 8, extraction of the resulting aqueous filtrate with a mixture of cresol-carbon tetrachloride, reextraction into water after the addition of acetone or ether, passing the purified concentrate over activated alumina, and extraction of the analog from the alumina column with a mixture of acetone and water. Upon diluting this aqeous extract with acetone, the analog precipitates in purified form and can readily be recovered. Chromatography of this product on alumina and elution with acetone-water, or on cellulose and elution with secondary butanol, followed by crystallization of the analog from acetone-water leads to pure crystalline material.

Thus, in accordance with the foregoing description 5-hydroxybenzimidazole can be condensed with Factor B to produce the corresponding analog of vitamin $B_{12}$. The analog so obtained can be further treated in accordance with methods known in the art to produce other analogs in which the cyanide group is replaced by a different anion, or by a hydroxyl group. For example, upon treating the analog in an aqueous medium containing a large excess of chloride ions, the corresponding chloro analog is produced, i. e., the product in which a Cl-ion replaces the CN group. Similarly, other analogs in which other acid anions replace the CN group can be obtained. Alternatively, the hydroxy analog can also be obtained following procedures known in the art for the preparation of the hydroxy analog of vitamin $B_{12}$.

The following examples are presented to illustrate the processes of the present invention in the production of the 5(6)-hydroxybenzimidazole analog of cobalamine.

*Example 1*

A medium for the production of the vitamin $B_{12}$ analog was prepared by dissolving the following in water:

| | Percent |
|---|---|
| L-glutamic acid | 2.0 |
| Betaine.$H_2O$ | 2.0 |
| $(NH_4)_2HPO_4$ | 0.4 |
| $Na_2SO_4$ | 0.4 |
| KCl | 0.16 |
| $MgSO_4.7H_2O$ | 0.10 |
| $MnSO_4.4H_2O$ | 0.04 |
| $ZnSO_4.7H_2O$ | 0.004 |
| $FeSO_4.7H_2O$ | 0.004 |

The resulting nutrient medium was adjusted to a pH of about 7 and 20 ml. of this medium was added to a 250 ml. Erlenmeyer flask plus sufficient water to give a final total volume of 40 ml. The resulting solution was then sterilized at about 15 lbs. pressure (121° C.) for 15 minutes. After cooling 220 micrograms of 5-hydroxybenzimidazole hydrobromide in 2 ml. of ethanol and about 56 micrograms of Factor B obtained by the acid hydrolysis of $Co^{60}$ vitamin $B_{12}$ were added to one flask. Similarly, 990 micrograms of 5-hydroxybenzimidazole hydrobromide and 56 micrograms of Factor B obtained by the acid hydrolysis of $Co^{60}$ vitamin $B_{12}$ were added to a second flask. The resulting solution was inoculated with a heavy vegetative inoculum of *E. coli* 113–3 and then incubated on a rotary shaker for 16 to 18 hours at 37° C.

After incubation the cells were removed by centrifugation and the separated cells mixed with a small volume of water. The cellular suspension was then adjusted to pH 5.0 and steamed in the autoclave for 30 minutes in the presence of 0.01% sodium cyanide. The cell debris was centrifuged off and the supernatant liquor containing the 5(6)-hydroxybenzimidazole analog was concentrated to dryness by freeze drying. The resulting residue was taken up in 0.5 ml. of water in preparation for paper chromatography.

The paper chromatogram was prepared by streaking 0.2 ml. of the concentrated extract on Whatman No. 1 filter paper. The resulting paper strip was then run for 48 hours in a descending secondary butanol-water-cyanide solvent mixture prepared by mixing 100 parts of secondary butanol, 50 parts of water, and 0.25 part of a 1% solution of sodium cyanide and discarding the aqueous phase. The distribution of the radioactivity on the paper was then determined by cutting the paper into lateral strips, eluting the material off the strips with water and counting the radioactivity in each eluate with a scintillation counter. The relative position of the radioactive analog was then determined with reference to the position of the non-radioactive vitamin $B_{12}$. The positions of the analog are expressed in terms of $R_z$. $R_z$ is defined as the ratio of the distance traveled by the analog to the distance moved by the vitamin $B_{12}$. Thus, by definition vitamin $B_{12}$ has an $R_z$ value of 1.0. From both flasks radioactive material was obtained at a $R_z$ of 0.7. Assuming Factor B to have a molecular weight of 1000 and the analog to have an M. W. of 1350, the amount of analog synthesized per flask (40 ml.) was 12γ with 220γ/flask of the 5-hydroxybenzimidazole.HBr and 16γ with 990γ/flask of the 5-hydroxybenzimidazole.

Paper chromatograms were also prepared from separate aliquots of the same freeze dried hot extracted cells and developed by bioautography using *Lactobacillus lactis* Dorner as the organism. Bioactive spots from both flasks are detected at an $R_f$ of 0.7.

The vegetative culture of *E. coli* 113.3 used to inoculate the nutrient medium described above was prepared as follows:

Stock cultures of *E. coli* 113.3 were maintained on slants of the following medium by weekly transfers and storage in the cold room:

| | | |
|---|---|---|
| Casein hydrolysate | percent | 0.25 |
| $MgSO_4.7H_2O$ | do | 0.02 |
| $K_2HPO_4$ | do | 0.02 |
| $FeSO_4.7H_2O$ | | Trace |
| Glycerol | percent | 0.2 |
| Asparagine | do | 0.0015 |
| Vitamin $B_{12}$ | γ/ml | 10 |
| Agar | percent | 20 |
| pH | | 7.0 |

The vegetative culture of *E. coli* was prepared by growing the *E. coli* in the following medium:

| | | |
|---|---|---|
| L-glutamic acid | percent | 1.0 |
| Betaine.$H_2O$ | do | 1.0 |
| $(NH_4)_2HPO_4$ | do | 0.2 |
| $Na_2SO_4$ | do | 0.2 |
| KCl | do | 0.08 |
| $MgSO_4.7H_2O$ | do | 0.05 |
| $MnSO_4.4H_2O$ | do | 0.02 |
| $ZnSO_4.7H_2O$ | do | 0.002 |
| $FeSO_4.7H_2O$ | do | 0.002 |
| DL-methionine | γ/ml | 20 |
| or | | |
| Vitamin $B_{12}$ | γ/ml | 10 |

40 ml. of this medium adjusted to a pH of about 7.0 was sterilized at 15 lbs. pressure (121° C.) for 15 minutes, cooled, and inoculated from *E. coli* stock slants. After incubation on a rotary shaker for 20 to 24 hours at 37° C. the cells from several flasks were combined, centrifuged, washed twice with distilled water, and slurried in about ⅕ to ⅟₁₀ of the original volume. This aqueous slurry of vegetative cells was used as the inoculum for the production medium.

Factor B containing $Co^{60}$ was prepared as follows:

Vitamin $B_{12}$ containing $Co^{60}$ was subjected to hydrolysis with hydrochloric acid and the degradation products and unreacted vitamin $B_{12}$ subject to chromatography on filter paper using a secondary butanol-water-cyanide system. The solvent was prepared by mixing 100 parts of secondary butanol, 50 parts water, and 0.25 part of a 1% solution of sodium cyanide and discarding the aqueous phase. The portions containing the Factor B were cut off and rerun on paper. The isolated Factor B moved as a single spot on paper chromatography and had about 200 counts per microgram as determined on a scintillation counter.

Example 2

This experiment was carried out in the same manner as Example 1 except only one concentration of 5-hydroxybenzimidazole.HBr was used, i. e., 220γ/flask. The eluate containing the radioactive analog was assayed also by means of *Lactobacillus leichmannii* (titrimetric method).

A material containing radioactivity was produced with an $R_f$ of 0.6. By means of the radioactivity in this region a calculated yield of 15γ of the 5(6)-hydroxybenzimidazole analog of $B_{12}$ was produced in the 40 ml. of medium in the flask. Material at an $R_f$ of 0.7 was active for *L. lactis*. The synthesized analog had 70% of the activity of $B_{12}$ for *L. leichmannii*, i. e., 1 mg. of the analog (calculated weight from radioactivity) had an apparent bioactivity equivalent 0.7 mg. of $B_{12}$.

The 5(6)-hydroxybenzimidazole analog prepared as shown in the foregoing examples are growth promoting agents for microorganisms such as *Lactobacillus lactis* Dorner and the like. In addition, these analogs are valuable growth promoting agents which can be utilized in place of vitamin $B_{12}$ in animal feedstuffs to accelerate the growth of domestic animals such as chickens, swine, and the like. The 5(6)-hydroxybenzimidazole analogs of cobalamines prepared in accordance with this invention are of pharmacological interest since they are different than vitamin $B_{12}$ but possess vitamin $B_{12}$ activity.

Various changes and modifications of the invention can be made and to the extent that such variations incorporate the spirit of this invention, they are intended to be included within the scope of the appended claims.

What is claimed is:

1. The process which comprises intimately contacting cells of *E. coli* 113-3 with Factor B and 5-hydroxybenzimizole in an aqueous medium to produce the 5(6)-hydroxybenzimidazole analog of cyano-cobalamin.
2. The process according to claim 1 when carried out with resting cells of *E. coli* 113-3 in a phosphate buffer.
3. The process according to claim 1 when carried out in a nutrient medium suitable for growing *E. coli* 113-3 under aerobic conditions.
4. The process which comprises intimately contacting cells of *E. coli* 113-3 with Factor B and 5-hydroxybenzimidazole in an aqueous medium, and recovering the 5(6)-hydroxybenzimidazole analog of cyano-cobalamin from the resulting cells.
5. The process according to claim 4 when carried out with resting cells *E. coli* 113-3 in a phosphate buffer.
6. The process according to claim 4 when carried out in a nutrient medium suitable for growing *E. coli* 113-3 under aerobic conditions.

References Cited in the file of this patent

UNITED STATES PATENTS 2,595,499    Wood et al. -------------- May 6, 1952

OTHER REFERENCES

Buchanan et al.: Jour. Chem. Soc. (1950), pages 2845–2855.
Armitage et al.: Jour. Chem. Soc. (1953), page 3849.
Davis et al.: Jour. Bact., 60 (1953), pages 17–28.
Chem. and Eng. News, 33, No. 34, August 1955, pages 3487, 3489.